United States Patent
Naumann et al.

(10) Patent No.: US 9,446,449 B2
(45) Date of Patent: Sep. 20, 2016

(54) METHOD FOR REPROFILING WHEELSETS ON UNDERFLOOR WHEEL LATHES

(75) Inventors: Hans J. Naumann, Chemnitz (DE); Theo Nijssen, Beesel (NL); Robert Mertens, Übach-Palenberg (DE); Hans-Joachim Reiche, Erkrath (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 391 days.

(21) Appl. No.: 13/989,259

(22) PCT Filed: Nov. 26, 2010

(86) PCT No.: PCT/DE2010/001399
§ 371 (c)(1),
(2), (4) Date: Nov. 7, 2013

(87) PCT Pub. No.: WO2012/069027
PCT Pub. Date: May 31, 2012

(65) Prior Publication Data
US 2014/0144301 A1    May 29, 2014

(51) Int. Cl.
*B23B 5/32* (2006.01)
*B23B 5/28* (2006.01)
*B23B 5/04* (2006.01)

(52) U.S. Cl.
CPC .. *B23B 5/32* (2013.01); *B23B 5/04* (2013.01); *B23B 5/28* (2013.01); *B23B 2215/36* (2013.01); *Y10T 82/10* (2015.01); *Y10T 82/18* (2015.01); *Y10T 82/185* (2015.01)

(58) Field of Classification Search
CPC ............ Y10T 409/305656; Y10T 82/10; Y10T 82/18; Y10T 82/2502; Y10T 82/185; B23C 3/02; B23C 3/04; B23C 3/16; B23B 2215/36; B23B 5/08; B23B 5/02; B23B 5/04; B23B 5/28; B23B 5/32
USPC ........... 82/1.11, 104, 118, 105, 112; 409/165
See application file for complete search history.

(56) References Cited

U.S. PATENT DOCUMENTS 3,598,017 A * 8/1971 Saari .................. B23B 5/28
409/165
4,033,209 A * 7/1977 Dombrowski ........... B23B 5/32
82/104

(Continued)

FOREIGN PATENT DOCUMENTS

DE           40 03 148 A1    8/1990
DE    10 2006 054 437 A1    5/2008

(Continued)

OTHER PUBLICATIONS

International Search Report for PCT/DE2010/001399, ISA/EP, Rijswijk, NL, mailed Jul. 6, 2011.

*Primary Examiner* — Daniel Howell
*Assistant Examiner* — Nicole N Ramos
(74) *Attorney, Agent, or Firm* — Harness, Dickey & Pierce, P.L.C.

(57) ABSTRACT

The invention relates to a method for reprofiling wheelsets (1) rotatably mounted in axle bearing housings (6) on rail vehicles on underfloor wheelset lathes (12; 14) equipped with machining tools, a machine control for the machining tools, drive rollers (15), axial guide rollers (17), measuring rollers (13) as well as clamping devices (21; 22) to engage the axle bearing housings (6). The method is characterised in that the wheelset (1) is lifted off the rail using the drive rollers (15), weighing it in the process, the axle bearing housings (6) are fixed between the drive rollers (15) and the clamping devices (21; 22), an axial guide roller (17) is adjusted to touch the inner side (16) of each of the two wheels (3; 4) of the wheelset (1) and fixed in this position, an additional force (20) is applied to the drive rollers (15), that the actual diameter (8) and the wear profile of each wheel (3; 4) is determined by means of a measuring roller (13), that the smaller actual diameter is determined based on the measurement results and, it having been modified by a specified machining allowance, entered as the nominal diameter (11) into the machine control for the machining tools.

18 Claims, 3 Drawing Sheets

(56) References Cited

U.S. PATENT DOCUMENTS

| | | | | |
|---|---|---|---|---|
| 4,116,094 A | * | 9/1978 | Dombrowski | B23B 5/32 82/104 |
| 4,200,012 A | * | 4/1980 | Wittkopp | B23B 5/28 82/1.11 |
| 4,347,769 A | * | 9/1982 | Dombrowski | B23B 5/32 82/104 |
| 4,597,143 A | * | 7/1986 | Dombrowski | B23B 5/28 29/27 R |
| 4,680,846 A | | 7/1987 | Feldewert | |
| 4,802,285 A | * | 2/1989 | Ligacz | B23B 5/28 33/203.11 |
| 5,555,632 A | * | 9/1996 | Naumann | B23B 5/28 33/203 |
| 5,678,966 A | * | 10/1997 | Heimann | B23B 5/28 409/138 |
| 2004/0014405 A1 | * | 1/2004 | Boms | B23B 5/32 451/63 |
| 2008/0216621 A1 | | 9/2008 | Nijssen | |
| 2010/0005935 A1 | * | 1/2010 | Ross | B23B 5/32 82/105 |
| 2010/0154606 A1 | * | 6/2010 | Thyni | B23B 5/32 82/105 |

FOREIGN PATENT DOCUMENTS

| | | |
|---|---|---|
| EP | 0 619 159 A1 | 10/1994 |
| WO | 2007/014972 A2 | 2/2007 |

* cited by examiner

METHOD FOR REPROFILING WHEELSETS ON UNDERFLOOR WHEEL LATHES

CROSS-REFERENCE TO RELATED APPLICATIONS

This application is a 371 U.S. National phase of PCT/DE2010/001399, filed on Nov. 26, 2010. The entire disclosure of the above application is incorporated herein by reference.

FIELD

This invention relates to a method for reprofiling wheelsets rotatably mounted in axle bearing housings on rail vehicles on underfloor wheelset lathes equipped with machining tools, a machine control for the machining tools, drive rollers, axial guide rollers, measuring rollers as well as clamping devices to engage the axle bearing housings.

BACKGROUND

EP 0 201 619 B1 describes a method for correcting the profile of a railway wheel in a material-saving way using a machining process. This well-known method is used when areas of the profile deviate from a nominal profile due to material wear on the running surface and/or wheel flange, it is characterised by the fact that profile areas with lesser wear are detected, whereupon these are subjected to a forming process, displacing material from the profile areas which flows into deeper-lying areas and at least partially fills the most worn areas with material before the radial position of a corrected profile is determined, which is produced by the cutting process and is offset radially outwards with respect to the wear profile. Hence, the application of this method presupposes that the worn wheel flange is subjected to a forming operation such as rolling or forging, and that thereby material is removed from the tip of the round edge of the wheel flange so that the amount of material that is displaced to the flange peak, thereby increasing the thickness of the wheel flange, is shifted towards the running surface. From this reference to the state of the art, it is apparent to an expert that the reprofiling of railway wheelsets can be performed only on machines which do not belong into the category of underfloor lathes. It would, therefore, seem to be impossible that the method disclosed in EP 0 201 619 B1 could be applied to underfloor wheelset lathes.

DE 10 2006 054 437 A1 describes a method for reprofiling a railway wheel belonging to a railway wheelset by machining. This method is characterised by limiting reprofiling to the removal of instances of out-of-roundness in a first, central area to both sides of the measuring circle plane of the railway wheel; in a second area extending from the outer edge of the profile to the central area, the nominal contour is restored, and in a third area extending from the middle section up to the wheel flange, reprofiling is limited to the removal of a layer close to the surface. Although this method is somewhat more suitable to be applied to underfloor wheelset lathes, there is nevertheless no indication in this principle according to DE 10 2006 054 437 A1 as to how highly accurate reprofiling can be carried out on an underfloor wheelset lathe.

However, highly accurate reprofiling of a wheelset is the prerequisite before such a wheelset can be used on high-speed vehicles. It is characteristic of the wear pattern of a wheelset for use in high-speed ranges that in the initial stage material will be rolled out in the area of the measuring circle plane and shifted equally to the wheel flange side and to the outer side of the wheel tyre.

This insight gives rise to the purpose of the present invention; namely, to propose a method in which the mileage of the wheelsets can be significantly increased with a minimal removal of material. According to the method to be created, it should in particular be possible to reprofile the wheelsets of high-speed vehicles. As such, a wheel to be reprofiled is to be machined on an underfloor wheelset lathe in a single cut with a cutting depth of between 0.1 mm to 0.2 mm. In doing so, the maximum deviation from the nominal diameter should not exceed a value of 0.1 mm. The highly accurate reprofiling on an underfloor wheelset lathe should also increase cost-effectiveness, since the wheelset does not need to be removed from the vehicle in order to be reprofiled.

SUMMARY

This section provides a general summary of the disclosure and is not a comprehensive disclosure of its full scope or all of its features.

According to the invention, this function is achieved by:
Lifting the wheelset off the rail using the drive rollers of the underfloor wheelset lathe and weighing it in the process
Fixing the axle bearing housings between the drive rollers and the clamping devices
Bringing an axial guide roller into contact on the inner side of each of the two wheels of the wheelset and fixing it in position
Applying additional force to the drive rollers
Determining the actual diameter and the wear profile of each wheel by using a measuring roller
Determining the smaller actual diameter based on the measurement results and, having modified it by a specified machining allowance, entering it as the nominal diameter into the machine control for the machining tools.

In an advantageous embodiment of the method, it is intended that the drive rollers be subjected to an additional force between 20 kN and 50 kN, preferably 30 kN for each drive roller. Thus, a particularly rigid clamping of the wheelset on the underfloor wheelset lathe is achieved.

According to a further advantageous embodiment, there is provision for the machining allowance to be selected between 0.10 mm and 0.25 mm, preferably 0.15 mm. Such a feed is useful for eliminating surface damage of the reprofiled profile by fine cracks.

A restoration of the profile is preferably performed by only a single machining cut. In this case, the procedure is as follows:

The machining is carried out from the outer side of the wheel towards the measuring circle plane, that is, in the first third of the actual profile, with a cutting depth of between 2 mm and 6 mm, preferably 4 mm. In the area of the measuring circle plane, that is in the area of the running circle of the actual profile, the machining is carried out with a depth of between 0.10 mm and 0.25 mm, preferably 0.15 mm. Thereafter, in the area of wheel flange flank, the machining is carried out with a depth of between 0.0 mm and 4.0 mm, preferably 2.0 mm. Consequently, it is possible that no material is removed in the area of the wheel flange flank. Finally, at the round edge of the wheel flange, the machining is carried out with a depth of between 2.0 mm and 6.0 mm, preferably 4.0 mm.

With such different cutting depths, the passive cutting forces which influence the stiffness of the clamping and thus the accuracy of the nominal diameter of the restored profile also change. In this case, the "specific cutting force" is to be taken into consideration. The specific cutting force is that force that is required for machining a material with a machining cross section of 1 mm². This force depends on the machinability of the material, the thickness of the chip taken off, the cutting speed and the cutting edge geometry of the cutting tool. The specific cutting force increases disproportionately with smaller chip thickness. This power increase has an impact on the accuracy of the profile to be produced. It is therefore important for the accurate machining of the wheel profile, the diameter and the concentricity, to ensure a rigid fixation; that is, clamping, of the wheel axle. It is also important to consider that the wheel axle remains mounted in axle bearing housings during machining on the underfloor wheelset lathe. The required bearing clearance must consequently be controlled in such a way that it does not enter into the machining result. This purpose is initially served by the fixation of the two wheels of the wheelset from the inner side by an axial guide roller which is brought into contact and then fixed on the inside of the wheel in its operative position. There is further provision for the axle bearing housings to be fixed by holding down with clamping lugs. However, the axle bearing housings can also be fixed with a support. Finally, there is also provision for the axle bearing housings be fixed by both holding down and fixing with a support.

By using this method, it becomes possible considerably to increase the mileage of wheelsets by removing a bare minimum of material. In this way, the wheelsets of high-speed vehicles in particular can be economically reprofiled.

The invention is described in detail below using a sample embodiment. A simplified depiction that is mostly schematic can be seen in the following figures:

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
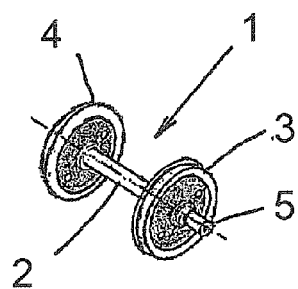
FIG. 1 shows a perspective view of a removed wheelset on a reduced scale.

The wheelset 1 shown in FIG. 1 comprises an axle shaft 2 and the two wheel discs 3 and 4. In the installed state, the wheelset 1 with its axle journals 5 is rotatably mounted in axle bearing housings 6 on the rail vehicle (not shown).

Figure 2:
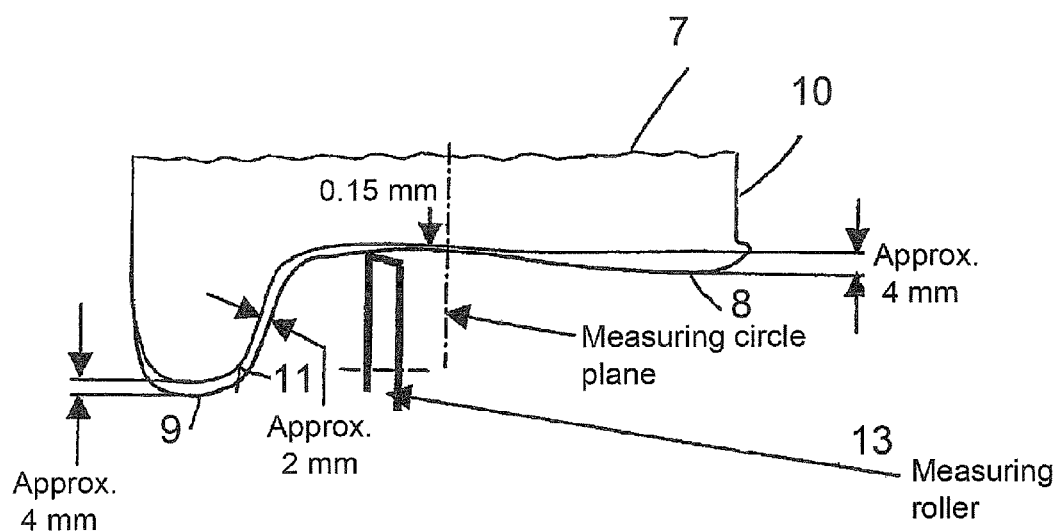
FIG. 2 shows a cross section through the wear profile of a wheelset.

FIG. 2 shows a section of the wheel profile 7 through which the wheel discs 3 and 4 are each limited in their outer circumference. Here, line 8 indicates the wear profile that develops on the wheelset 1 after a certain mileage. This wear profile 8 is the actual profile, and it is obvious that material was rolled out from the measuring circle plane and was equally shifted to the side of the wheel flange 9 and to the outer side 10 of the wheel profile 7.

For reprofiling it is necessary to eliminate the actual profile 8 and restore a nominal profile 11 that meets the requirements of the reprofiling of the wheelset 1. In this case, the underfloor wheelset lathe is equipped with a measuring roller 13 to determine the actual profile 8, and this is also used to confirm the work result by checking the restored nominal profile 11. The results obtained from the measuring roller 13 are entered into the machine control (not shown), in which case the measurement results from the left wheel disc 4 and the right wheel disc 3 can be compared with each other and then the smaller of the actual diameters of the two wheel discs 3; 4 minus a machining allowance of, for example, 2×0.15 mm is entered as the target diameter. This allowance of 0.15 mm is necessary to rule out residual damage to the nominal profile 11, which can be formed by material displacement in the form of minute cracks. In FIG. 2, each of the cutting depths is given with which, starting from the actual profile 8, the nominal profile 11 can be restored.

Figure 3:
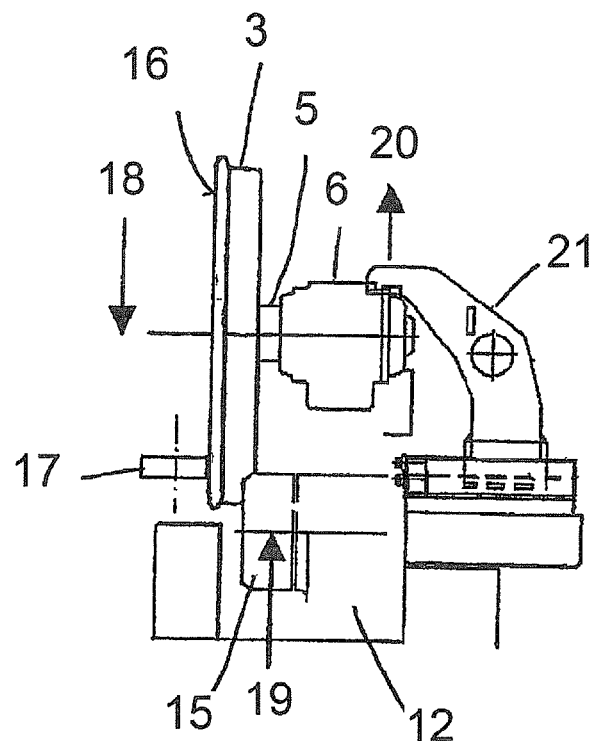
FIG. 3 shows a variant of the axle bearing fixation by holding down, in a side view.

FIG. 3 shows a version for fixing an axle bearing housing 6 by holding it down. In the underfloor wheelset lathe 12, the wheel disc 3 is supported from below by two drive rollers, of which only one drive roller 15 is shown. At the same time, the wheel disc 3 is fixed on its inner side 16 by an axial guide roller 17. The wheel load 18 indicated by an arrow is offset by a force 19, also indicated by an arrow, on the drive rollers 15, which is composed of a reaction force corresponding to the amount of the wheel load 18 and a further additional load 20 indicated by an arrow. The additional load 20 causes the clamping lug 21 which is used to hold down the axle bearing housing 6 on the underfloor wheelset lathe 12 to be deformed by bending upwards. At the same time, the additional load 20 acts on the clamping lug 21 and deforms it depending on its stiffness. During machining, the additional load 20 is increased by the specific cutting force which has already been explained above. Due to the finite stiffness of the total system consisting of the wheel disc 3, axle journal 5, axle bearing housing 6, clamping lug 21, underfloor wheelset lathe 12 and drive rollers 15, the additional load 20 affects the machining accuracy.

Figure 4:
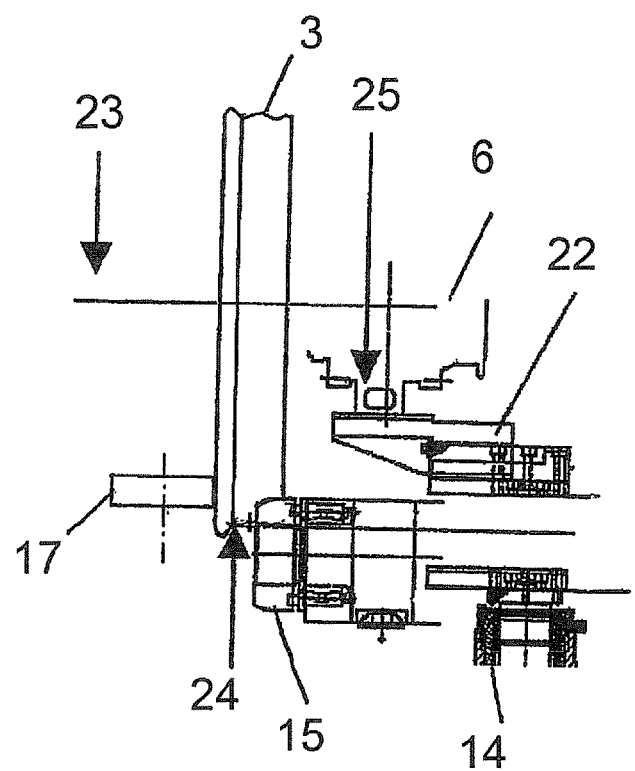
FIG. 4 shows a variant of the axle bearing fixation with a support, in a side view.

FIG. 4 shows a version for fixing an axle bearing housing 6 by means of a support 22. Such a support 22 is used, for example, in vehicles with a sufficient wheel load 23 (indicated by an arrow) larger than about 120 kN. A load reduction 24 of about 20 kN, indicated by an arrow, yields a resultant force 25, also indicated by an arrow, which acts via the axle bearing housing 6 on the support 22 of the underfloor wheelset lathe 14 and deforms it in accordance to its stiffness. During machining, the resultant force 25 is reduced by the specific cutting force. Due to the finite stiffness of the system, this reduction affects the machining accuracy as well.

Figure 5:
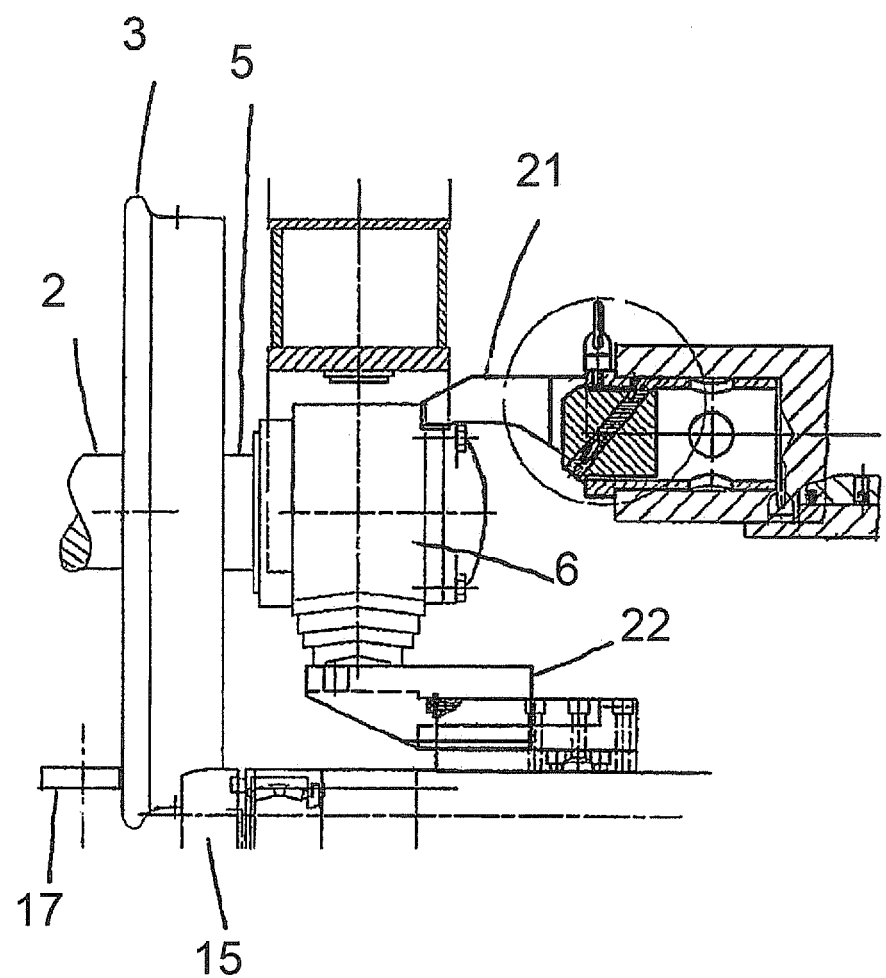
FIG. 5 shows a variant of the axle bearing fixation with a support and by holding down in a side view.

FIG. 5 shows a version for fixing an axle bearing housing 6 by holding it down with a clamping lug 21 and a support 22. With this clamping variant, the negative effects of the passive cutting force, as described in connection with FIG. 3 and FIG. 4, cancel each other out. Accordingly, this clamping variant is optimal for economical reprofiling of railway wheelsets 1 with a single cut.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for machining the profiles of first and second wheel discs of a wheelset for a vehicle operable to travel on rails while the wheelset is rotatably mounted on the rail vehicle in first and second axle bearing housings of the rail vehicle, the method comprising:
  providing an underfloor wheelset lathe equipped with machining tools, a machine control for the machining tools, a plurality of drive rollers, first and second axial guide rollers, first and second measuring rollers, and first and second devices operable to, respectively, fix the first and second axle bearing housings;
  lifting the wheelset off the rails;
  determining a wheel load at the wheelset;
  fixing the first and second axle bearing housings, respectively, with the first and second devices;
  contacting each of the first and second axial guide rollers, respectively, with an inner side of each the first and second wheel discs of the wheelset and fixing each of the axial guide rollers in place;
  supporting the first and second wheel discs with the drive rollers against the wheel load by a force;
  measuring an actual profile of each of the first and second wheel discs with the first and second measuring rollers;
  determining a smallest actual diameter from the actual profiles of the first and second wheel discs;
  determining a target diameter by subtracting a machining allowance from the smallest actual diameter; and
  entering the target diameter into the machine control for the machining tools.

2. The method according to claim 1, wherein the force comprises a reaction force equal to the wheel load and an additional force that is greater than zero.

3. The method according to claim 2, wherein the additional force is 30 kN.

4. The method according to claim 2, wherein the additional force is between 20 kN and 50 kN.

5. The method according to claim 1, wherein the machining allowance is between 0.10 mm and 0.25 mm.

6. The method according to claim 5, wherein the machining allowance is 0.15 mm.

7. The method according to claim 1, wherein the machining of each wheel disc is carried out from an outer side of the wheel disc toward a measuring circle plane of the respective wheel disc and, in a first third of the actual profile of the respective wheel disc, at a cutting depth of between 2 mm and 6 mm.

8. The method according to claim 7, wherein, in an area of the measuring circle plane of the respective wheel disc, the machining of each wheel disc is carried out at a cutting depth of between 0.10 mm and 0.25 mm.

9. The method according to claim 7, wherein, in an area of a wheel flange flank of the respective wheel disc, the machining of each wheel disc is carried out at a cutting depth of between 0.0 mm and 4.0 mm.

10. The method according to claim 7, wherein, on a round edge of wheel flange, the machining of each wheel disc is carried out at a cutting depth of between 2.0 mm and 6.0 mm.

11. The method according to claim 7, wherein the machining of each wheel disc is carried out with a single machining cut.

12. The method according to claim 7, wherein the machining of each wheel disc is carried out from an outer side of the wheel disc toward a measuring circle plane of the respective wheel disc and, in a first third of the actual profile of the respective wheel disc, at a cutting depth of 4 mm.

13. The method according to claim 12, wherein, in an area of the measuring circle plane of the respective wheel disc, the machining of each wheel disc is carried out at a cutting depth of 0.15 mm.

14. The method according to claim 12, wherein, in an area of a wheel flange flank of the respective wheel disc, the machining of each wheel disc is carried out at a cutting depth of 2.0 mm.

15. The method according to claim 12, wherein, on a round edge of wheel flange, the machining of each wheel disc is carried out at a cutting depth of 4.0 mm.

16. The method according to claim 1, wherein fixing the first and second axle bearing housings, respectively, with the first and second devices comprises holding down the axle bearing housings with first and second clamping lugs.

17. The method according to claim 1, wherein fixing the first and second axle bearing housings, respectively, with the first and second devices comprises fixing the axle bearing housings with a support.

18. The method according to claim 1, wherein fixing the first and second axle bearing housings, respectively, with the first and second devices comprises fixing the axle bearing housings with a support and with first and second clamping lugs.

* * * * *